(No Model.)

P. GENDRON.
BICYCLE PEDAL.

No. 505,825. Patented Oct. 3, 1893.

Witnesses
A. L. Kabbie
J. McDogherty

Inventor
Peter Gendron
By Thos. H. Sprague & Son
Attys.

UNITED STATES PATENT OFFICE.

PETER GENDRON, OF TOLEDO, OHIO, ASSIGNOR TO THE GENDRON IRON WHEEL COMPANY, OF SAME PLACE.

BICYCLE-PEDAL.

SPECIFICATION forming part of Letters Patent No. 505,825, dated October 3, 1893.

Application filed March 21, 1893. Serial No. 467,040. (No model.)

*To all whom it may concern:*

Be it known that I, PETER GENDRON, a citizen of the United States, residing at Toledo, in the county of Lucas and State of Ohio, have invented certain new and useful Improvements in Bicycle-Pedals, of which the following is a specification, reference being had therein to the accompanying drawings.

This invention relates to a new and useful improvement in bicycle pedals and consists in the construction and arrangement of parts hereinafter described and definitely pointed out in the claim.

Figure 1:
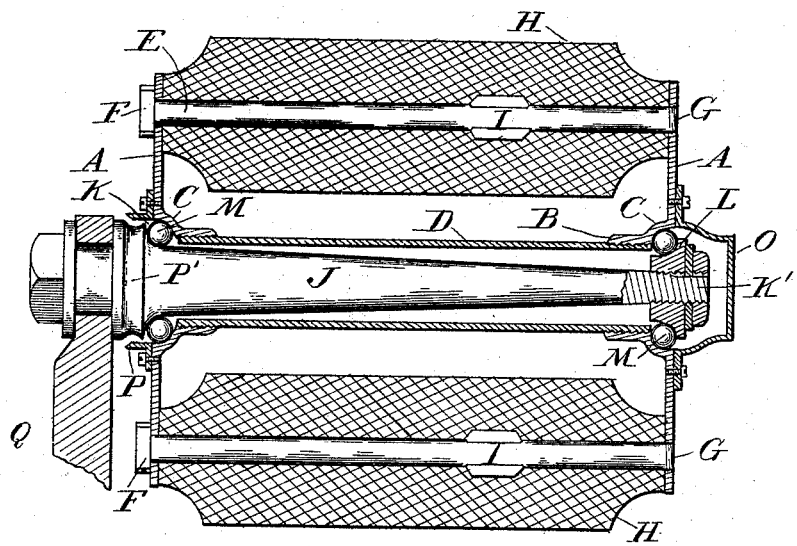
Figure 2:
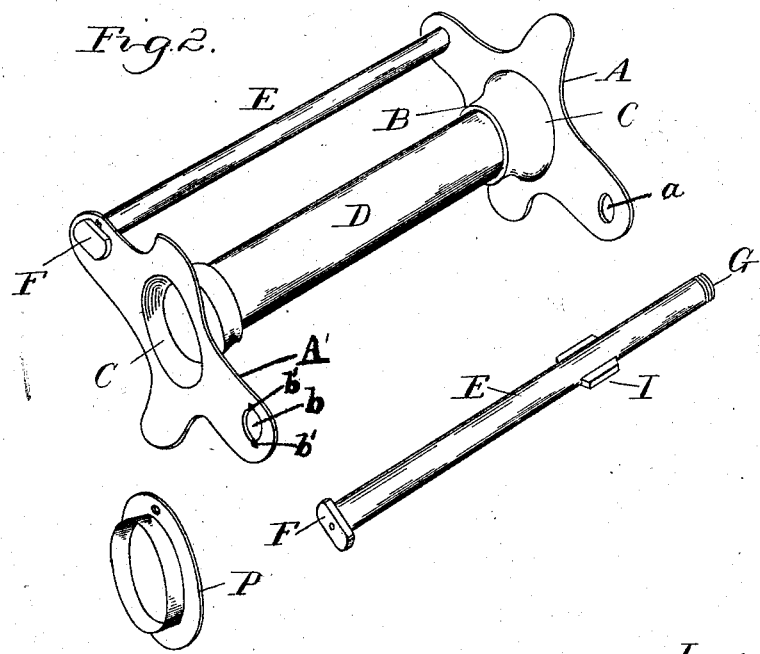

In the drawings, Figure 1 is a central, longitudinal section through my improved pedal. Fig. 2 is a detached perspective view of the pedal frame, the rubber foot pieces being removed.

My pedal is designed to be constructed for the purpose, first, of getting strength combined with lightness; second, of reducing the cost of manufacture and obtaining as nearly dust-proof bearings as possible, and, third, of getting the best possible bearings for the foot of the rider.

The heads A A' I preferably make of sheet metal cutting them out into the desired form, substantially as shown and pressing out in the center the tubular nipples B with a curved portion C of greater diameter than the nipples between the nipples and the end plates. The nipples B I provide with interior screw threads and the two heads are connected together by means of a tube D suitably screw-threaded to engage with the nipples.

The plate A is provided near its outer end with screw thread apertures $a$ and the plate A' is provided near its opposite end with apertures $b$ having grooves $b'$ extending therefrom in opposite directions. The ends of the plates A are connected together by means of the bolts E having a head F at one end and the short threaded portion G at the other end, this screw-threaded portion being preferably just equal to the thickness of the plate G. The bolts pass through one plate A and the screw-threaded portion at their ends is screwed into an aperture in the opposite plate tightly binding the two together, and in this way I dispense with the use of all nuts on these bolts, lightening the frame and improving its appearance.

H are the rubber foot pieces which are sleeved upon the bolts E when these bolts are put in position.

The bolts E are provided with laterally extending wings I which are preferably forced into the rubber in sleeving the rubber pieces upon the bolt and hold these foot pieces from turning upon the bolt, preferably with the upper faces in line, so that when the operator puts his foot upon the pedal, the ball of the foot will press down upon the inner lip of the pedal rubber and compress that lip giving a springy action for the foot, which I consider preferable to a construction in which the rubber pieces are pivoted upon the bolt and turned to conform with the shape of the foot. By providing the end plate A' with the apertures $b$ having the grooves $b'$ extending therefrom I am enabled to quickly assemble the parts by passing the bolts E through the apertures $b$ in the plate A' the wings on the bolt passing through the grooves $b'$.

J is the pedal shaft, preferably tapering and having a ball race K formed at the larger end and having the screw-threaded free end K' with which the cone nut L engages and forms a corresponding bearing on the shaft to the ball race C of the frame, suitable balls M being employed to form the usual ball bearings. A washer and jam nut are used to hold the cone L in its position.

In order to make the pedal as nearly dust-proof as possible, I use a flange cap O which I secure to the frame, entirely covering the opening in the end plate A and a flange dust ring P at the other end projecting some distance over the head P' on the pedal shaft. At Q I show the crank to which the pedal shaft is secured.

What I claim as my invention is—

In a bicycle pedal, the combination with end plates, having apertures near their opposite outer ends one plate being provided with grooves extending out from the apertures of single cylindrical bolts connecting the respective ends of the plates, formed with oppositely extending wings intermediate their ends, and single heads and rubbers sleeved on the bolts over the wings, substantially as described.

In testimony whereof I affix my signature in presence of two witnesses.

PETER GENDRON.

Witnesses:
M. B. O'Dogherty,
N. L. Lindop.